United States Patent
Blackwell et al.

(10) Patent No.: US 8,105,686 B2
(45) Date of Patent: Jan. 31, 2012

(54) ASYMMETRIC MULTILAYERED POLYMERIC FILM AND LABEL STOCK AND LABEL THEREOF

(75) Inventors: Christopher J. Blackwell, Garrettsville, OH (US); Kevin O. Henderson, Willoughby Hills, OH (US)

(73) Assignee: Avery Dennison Corporation, Pasadena, CA (US)

( * ) Notice: Subject to any disclaimer, the term of this patent is extended or adjusted under 35 U.S.C. 154(b) by 1028 days.

(21) Appl. No.: 12/063,295

(22) PCT Filed: Jul. 17, 2007

(86) PCT No.: PCT/US2007/073674
§ 371 (c)(1),
(2), (4) Date: Feb. 8, 2008

(87) PCT Pub. No.: WO2008/011402
PCT Pub. Date: Jan. 24, 2008

(65) Prior Publication Data
US 2008/0199647 A1    Aug. 21, 2008

Related U.S. Application Data

(60) Provisional application No. 60/807,554, filed on Jul. 17, 2006.

(51) Int. Cl.
*B32B 7/02* (2006.01)
*B32B 7/12* (2006.01)
*B32B 27/06* (2006.01)
*B32B 27/08* (2006.01)
*B32B 27/32* (2006.01)

(52) U.S. Cl. ............... 428/355 AC; 428/40.1; 428/41.3; 428/41.8; 428/343; 428/353; 428/355 R; 428/355 EN; 428/515; 428/516; 428/520; 428/522; 428/523; 428/910; 428/914

(58) Field of Classification Search ..................... None
See application file for complete search history.

(56) References Cited

U.S. PATENT DOCUMENTS

| | | |
|---|---|---|
| 3,113,986 A | 12/1963 | Breslow et al. |
| 3,207,735 A | 9/1965 | Wijga |
| 3,207,736 A | 9/1965 | Wijga |
| 3,207,737 A | 9/1965 | Wales |
| 3,207,738 A | 9/1965 | Wijga |
| 3,207,739 A | 9/1965 | Wales |
| 3,251,905 A | 5/1966 | Zelinski |
| 3,390,207 A | 6/1968 | Moss et al. |
| 3,598,887 A | 8/1971 | Darcy et al. |

(Continued)

FOREIGN PATENT DOCUMENTS
EP    0029368    5/1981
(Continued)

OTHER PUBLICATIONS

NR. Dharmarajan and T.C. Yu, Modifying Polypropylene With a Metallocene Plastomer, Plastics Engineering, pp. 33-35, Aug. 1996 (3 pages).

(Continued)

*Primary Examiner* — Vivian Chen

(57) ABSTRACT

A polymeric film for labeling articles comprises an asymmetric multilayered film comprising specialized skin and core layers whose compositions address multiple needs including adhesion of a printing ink and an adhesive and die-cuttability. The polymeric film provides improved performance in the conversion to an adhesive containing label stock and adhesive label.

24 Claims, 1 Drawing Sheet

U.S. PATENT DOCUMENTS

| | | | | |
|---|---|---|---|---|
| 3,639,521 | A | 2/1972 | Hsieh | |
| 3,894,904 | A * | 7/1975 | Cook | 156/229 |
| 4,016,118 | A | 4/1977 | Hamada et al. | |
| 4,188,350 | A | 2/1980 | Vicik et al. | |
| 4,205,021 | A | 5/1980 | Morita et al. | |
| 4,207,363 | A | 6/1980 | Lustig et al. | |
| 4,208,356 | A | 6/1980 | Fukawa et al. | |
| 4,219,627 | A | 8/1980 | Halasa et al. | |
| 4,226,952 | A | 10/1980 | Halasa et al. | |
| 4,314,039 | A | 2/1982 | Kawai et al. | |
| 4,340,640 | A | 7/1982 | Weiner | |
| 4,371,645 | A | 2/1983 | Mahaffey, Jr. | |
| 4,399,180 | A | 8/1983 | Briggs et al. | |
| 4,405,667 | A | 9/1983 | Christensen et al. | |
| 4,407,873 | A | 10/1983 | Christensen et al. | |
| 4,407,874 | A | 10/1983 | Gehrke | |
| 4,434,264 | A | 2/1984 | Ficker | |
| 4,447,485 | A * | 5/1984 | Aritake | 428/144 |
| 4,463,113 | A | 7/1984 | Nakahara et al. | |
| 4,508,872 | A | 4/1985 | McCullough, Jr. | |
| 4,514,534 | A | 4/1985 | DiNardo | |
| 4,522,887 | A | 6/1985 | Koebisu et al. | |
| 4,532,280 | A | 7/1985 | Kobayashi et al. | |
| 4,535,125 | A | 8/1985 | McCullough, Jr. | |
| 4,564,559 | A | 1/1986 | Wagner, Jr. et al. | |
| 4,565,738 | A | 1/1986 | Purdy | |
| 4,578,429 | A | 3/1986 | Gergen et al. | |
| 4,581,262 | A | 4/1986 | Karabedian | |
| 4,585,679 | A | 4/1986 | Karabedian | |
| 4,588,775 | A | 5/1986 | McCullough, Jr. | |
| 4,604,324 | A | 8/1986 | Nahmias et al. | |
| 4,605,576 | A | 8/1986 | Jabarin | |
| 4,613,547 | A | 9/1986 | Wagner, Jr. et al. | |
| 4,613,643 | A | 9/1986 | Nakamura et al. | |
| 4,621,119 | A | 11/1986 | Lu | |
| 4,626,574 | A | 12/1986 | Cancio et al. | |
| 4,634,735 | A | 1/1987 | Thiersault et al. | |
| 4,643,945 | A | 2/1987 | Kiang | |
| 4,657,970 | A | 4/1987 | Shiraki et al. | |
| 4,663,216 | A | 5/1987 | Toyoda et al. | |
| 4,684,578 | A | 8/1987 | Inoue et al. | |
| 4,692,489 | A | 9/1987 | Ficker et al. | |
| 4,695,503 | A | 9/1987 | Liu et al. | |
| 4,704,421 | A | 11/1987 | Teskin | |
| 4,713,273 | A * | 12/1987 | Freedman | 428/41.8 |
| 4,720,427 | A | 1/1988 | Clauson et al. | |
| 4,728,377 | A | 3/1988 | Gallagher | |
| 4,748,206 | A | 5/1988 | Nogiwa et al. | |
| 4,752,597 | A | 6/1988 | Turner | |
| 4,769,284 | A | 9/1988 | Kakugo et al. | |
| 4,778,697 | A | 10/1988 | Genske et al. | |
| 4,795,782 | A | 1/1989 | Lutz et al. | |
| 4,798,081 | A | 1/1989 | Hazlitt et al. | |
| 4,808,561 | A | 2/1989 | Welborn, Jr. | |
| 4,833,024 | A | 5/1989 | Mueller | |
| 4,843,129 | A | 6/1989 | Spenadel et al. | |
| 4,865,908 | A | 9/1989 | Liu et al. | |
| 4,880,422 | A | 11/1989 | McBride | |
| 4,906,315 | A | 3/1990 | McGrew | |
| 4,913,858 | A | 4/1990 | Miekka et al. | |
| 4,933,120 | A | 6/1990 | D'Amato et al. | |
| 4,937,299 | A | 6/1990 | Ewen et al. | |
| 4,956,232 | A | 9/1990 | Balloni et al. | |
| 4,966,795 | A | 10/1990 | Genske et al. | |
| 4,988,465 | A | 1/1991 | Lustig et al. | |
| 5,003,915 | A | 4/1991 | D'Amato et al. | |
| 5,026,592 | A | 6/1991 | Janocha et al. | |
| 5,026,778 | A | 6/1991 | Fujii et al. | |
| 5,028,480 | A * | 7/1991 | Dean | 428/314.4 |
| 5,049,436 | A | 9/1991 | Morgan et al. | |
| 5,049,605 | A | 9/1991 | Rekers | |
| 5,068,155 | A | 11/1991 | Yamada et al. | |
| 5,083,850 | A | 1/1992 | Mallik et al. | |
| 5,084,558 | A | 1/1992 | Rausch et al. | |
| 5,085,816 | A | 2/1992 | McCord | |
| 5,100,728 | A | 3/1992 | Plamthottam et al. | |
| 5,116,548 | A | 5/1992 | Mallik et al. | |
| 5,145,212 | A | 9/1992 | Mallik | |
| 5,151,309 | A | 9/1992 | Dollinger | |
| 5,164,227 | A | 11/1992 | Miekka et al. | |
| 5,164,444 | A | 11/1992 | Bernard | |
| 5,186,782 | A | 2/1993 | Freedman | |
| 5,206,075 | A | 4/1993 | Hodgson, Jr. | |
| 5,212,246 | A | 5/1993 | Ogale | |
| 5,217,812 | A * | 6/1993 | Lee | 428/461 |
| 5,242,650 | A | 9/1993 | Rackovan et al. | |
| 5,252,384 | A | 10/1993 | Bothe et al. | |
| 5,254,394 | A | 10/1993 | Bothe et al. | |
| 5,272,236 | A | 12/1993 | Lai et al. | |
| 5,275,886 | A | 1/1994 | Chu et al. | |
| 5,278,272 | A | 1/1994 | Lai et al. | |
| 5,316,777 | A * | 5/1994 | Toyoda et al. | 426/87 |
| 5,332,542 | A | 7/1994 | Yamanaka et al. | |
| 5,342,868 | A | 8/1994 | Kimura et al. | |
| 5,358,792 | A | 10/1994 | Mehta et al. | |
| 5,376,417 | A | 12/1994 | Amano et al. | |
| 5,380,572 | A | 1/1995 | Kotani et al. | |
| 5,380,810 | A | 1/1995 | Lai et al. | |
| 5,382,631 | A | 1/1995 | Stehling et al. | |
| 5,395,471 | A | 3/1995 | Obijeski et al. | |
| 5,407,732 | A | 4/1995 | Dokurno | |
| 5,414,040 | A | 5/1995 | McKay et al. | |
| 5,424,362 | A | 6/1995 | Hwang et al. | |
| 5,427,807 | A | 6/1995 | Chum et al. | |
| 5,435,963 | A | 7/1995 | Rackovan et al. | |
| 5,451,455 | A | 9/1995 | Peiffer et al. | |
| 5,462,809 | A | 10/1995 | Berkowitz | |
| 5,464,690 | A | 11/1995 | Boswell | |
| 5,468,440 | A | 11/1995 | McAlpin et al. | |
| 5,468,535 | A | 11/1995 | Amano et al. | |
| 5,474,820 | A | 12/1995 | Murschall et al. | |
| 5,475,075 | A | 12/1995 | Brant et al. | |
| 5,482,780 | A | 1/1996 | Wilkie et al. | |
| 5,491,019 | A | 2/1996 | Kuo | |
| 5,492,757 | A | 2/1996 | Schuhmann et al. | |
| 5,496,600 | A | 3/1996 | Peiffer et al. | |
| 5,503,923 | A | 4/1996 | Goto et al. | |
| 5,508,090 | A | 4/1996 | Peiffer et al. | |
| 5,516,563 | A | 5/1996 | Schumann et al. | |
| 5,525,695 | A | 6/1996 | Lai et al. | |
| 5,529,843 | A | 6/1996 | Dries et al. | |
| 5,530,054 | A | 6/1996 | Tse et al. | |
| 5,530,055 | A | 6/1996 | Needham | |
| 5,560,563 | A | 10/1996 | Janson, Jr. et al. | |
| 5,560,885 | A | 10/1996 | Murschall et al. | |
| 5,562,958 | A | 10/1996 | Walton et al. | |
| 5,573,723 | A | 11/1996 | Peiffer et al. | |
| 5,582,923 | A | 12/1996 | Kale et al. | |
| 5,585,193 | A | 12/1996 | Josephy et al. | |
| 5,591,390 | A | 1/1997 | Walton et al. | |
| 5,594,070 | A | 1/1997 | Jacoby et al. | |
| 5,595,705 | A | 1/1997 | Walton et al. | |
| 5,639,811 | A | 6/1997 | Plamthottam et al. | |
| 5,643,678 | A | 7/1997 | Boswell | |
| 5,662,985 | A | 9/1997 | Jensen et al. | |
| 5,665,800 | A | 9/1997 | Lai et al. | |
| 5,670,003 | A | 9/1997 | Boswell | |
| 5,674,342 | A | 10/1997 | Obijeski et al. | |
| 5,674,580 | A | 10/1997 | Boswell | |
| 5,677,383 | A | 10/1997 | Chum et al. | |
| 5,685,128 | A | 11/1997 | Chum et al. | |
| 5,691,043 | A | 11/1997 | Keller et al. | |
| 5,709,937 | A | 1/1998 | Adams et al. | |
| 5,711,839 | A | 1/1998 | Dronzek, Jr. | |
| 5,712,031 | A | 1/1998 | Kelch et al. | |
| 5,716,669 | A | 2/1998 | LaRose et al. | |
| 5,747,594 | A | 5/1998 | deGroot et al. | |
| 5,753,349 | A | 5/1998 | Boswell | |
| 5,756,169 | A | 5/1998 | Peiffer et al. | |
| 5,759,648 | A | 6/1998 | Idlas | |
| 5,759,683 | A | 6/1998 | Boswell | |
| 5,773,155 | A | 6/1998 | Kale et al. | |
| 5,783,017 | A | 7/1998 | Boswell | |
| 5,783,638 | A | 7/1998 | Lai et al. | |
| 5,792,549 | A | 8/1998 | Wilkie | |
| 5,810,957 | A | 9/1998 | Boswell | |
| 5,844,045 | A | 12/1998 | Kolthammer et al. | |

| | | | |
|---|---|---|---|
| 5,847,053 A | 12/1998 | Chum et al. | |
| 5,849,419 A | 12/1998 | Josephy et al. | |
| 5,852,152 A | 12/1998 | Walton et al. | |
| 5,863,665 A | 1/1999 | Kale et al. | |
| 5,863,834 A | 1/1999 | Kawaguchi et al. | |
| 5,869,575 A | 2/1999 | Kolthammer et al. | |
| 5,874,139 A | 2/1999 | Bosiers et al. | |
| 5,885,699 A | 3/1999 | Watson et al. | |
| 5,885,707 A | 3/1999 | Kaschel et al. | |
| 5,897,941 A | 4/1999 | Shah | |
| 5,900,310 A | 5/1999 | Murschall et al. | |
| 5,907,942 A | 6/1999 | Eichbauer | |
| 5,922,800 A | 7/1999 | Crotty et al. | |
| 5,932,157 A | 8/1999 | Dries et al. | |
| 5,948,199 A | 9/1999 | McGrew | |
| 5,955,205 A | 9/1999 | Ramsey et al. | |
| 5,962,092 A | 10/1999 | Kuo et al. | |
| 5,972,443 A | 10/1999 | Breck et al. | |
| 5,972,444 A | 10/1999 | Patel et al. | |
| 5,986,028 A | 11/1999 | Lai et al. | |
| 5,998,017 A | 12/1999 | Eichbauer | |
| 6,007,665 A | 12/1999 | Bourdelais et al. | |
| 6,017,615 A | 1/2000 | Thakker et al. | |
| 6,020,046 A | 2/2000 | Abhau | |
| 6,033,514 A | 3/2000 | Davis et al. | |
| 6,042,930 A * | 3/2000 | Kelch et al. | 428/195.1 |
| 6,051,305 A | 4/2000 | Hsu | |
| 6,060,567 A | 5/2000 | Lai et al. | |
| 6,072,005 A | 6/2000 | Kobylivker et al. | |
| 6,074,762 A | 6/2000 | Cretekos et al. | |
| 6,083,611 A | 7/2000 | Eichbauer et al. | |
| 6,093,464 A | 7/2000 | Tokunaga et al. | |
| 6,093,480 A | 7/2000 | Eichbauer | |
| 6,094,889 A | 8/2000 | Van Loon et al. | |
| 6,096,014 A | 8/2000 | Haffner et al. | |
| 6,111,023 A | 8/2000 | Chum et al. | |
| 6,111,102 A | 8/2000 | Schlegel | |
| 6,127,043 A | 10/2000 | Lange | |
| 6,136,937 A | 10/2000 | Lai et al. | |
| 6,140,442 A | 10/2000 | Knight et al. | |
| 6,165,609 A | 12/2000 | Curatolo | |
| 6,183,856 B1 | 2/2001 | Amon | |
| 6,194,532 B1 | 2/2001 | Maugans et al. | |
| 6,197,886 B1 | 3/2001 | Chatterjee et al. | |
| 6,204,335 B1 | 3/2001 | Somers | |
| 6,214,443 B1 | 4/2001 | Palmasi et al. | |
| 6,231,936 B1 | 5/2001 | Kozimor et al. | |
| 6,231,975 B1 | 5/2001 | Kong et al. | |
| 6,248,851 B1 | 6/2001 | Maugans et al. | |
| 6,288,168 B1 | 9/2001 | Shiromoto et al. | |
| 6,300,415 B1 | 10/2001 | Okayama et al. | |
| 6,300,419 B1 | 10/2001 | Sehanobish et al. | |
| 6,303,233 B1 | 10/2001 | Amon et al. | |
| 6,306,518 B1 | 10/2001 | Shah et al. | |
| 6,316,549 B1 | 11/2001 | Chum et al. | |
| 6,319,975 B1 | 11/2001 | Lee et al. | |
| 6,322,883 B1 | 11/2001 | Williams | |
| 6,329,454 B1 | 12/2001 | Krabbenborg | |
| 6,333,096 B1 | 12/2001 | Rodgers et al. | |
| 6,340,532 B1 | 1/2002 | Huang et al. | |
| 6,344,250 B1 | 2/2002 | Arthurs | |
| 6,348,555 B1 | 2/2002 | Lai et al. | |
| 6,362,270 B1 | 3/2002 | Chaudhary et al. | |
| 6,364,988 B1 | 4/2002 | Lin | |
| 6,368,545 B1 | 4/2002 | Bailey et al. | |
| 6,376,058 B1 | 4/2002 | Schut et al. | |
| 6,379,605 B1 | 4/2002 | Lin | |
| 6,384,123 B1 | 5/2002 | Young | |
| 6,391,425 B1 | 5/2002 | Migliorini et al. | |
| 6,410,648 B1 | 6/2002 | Sasaki et al. | |
| 6,423,420 B1 | 7/2002 | Brant et al. | |
| 6,436,496 B1 | 8/2002 | Rackovan et al. | |
| 6,436,531 B1 * | 8/2002 | Kollaja et al. | 428/355 R |
| 6,436,534 B1 | 8/2002 | Knight et al. | |
| 6,440,533 B1 | 8/2002 | Ray et al. | |
| 6,441,094 B1 | 8/2002 | Cecchin et al. | |
| 6,448,355 B1 | 9/2002 | Knight et al. | |
| 6,451,426 B2 | 9/2002 | Kong et al. | |
| 6,455,171 B2 | 9/2002 | Scheibelhoffer et al. | |
| 6,461,706 B1 * | 10/2002 | Freedman et al. | 428/40.1 |
| 6,472,077 B1 | 10/2002 | Cretekos et al. | |
| 6,486,284 B1 | 11/2002 | Karande et al. | |
| 6,489,019 B1 | 12/2002 | Shah et al. | |
| 6,495,266 B1 | 12/2002 | Migliorini | |
| 6,500,563 B1 | 12/2002 | Datta et al. | |
| 6,500,901 B2 | 12/2002 | Somers | |
| 6,503,619 B1 | 1/2003 | Neal et al. | |
| 6,503,635 B1 | 1/2003 | Kong et al. | |
| 6,503,637 B1 | 1/2003 | Van Loon | |
| 6,506,867 B1 | 1/2003 | Lai et al. | |
| 6,515,093 B1 | 2/2003 | Somers | |
| 6,534,612 B1 | 3/2003 | Lai et al. | |
| 6,548,611 B2 | 4/2003 | Lai et al. | |
| 6,566,446 B1 | 5/2003 | Parikh et al. | |
| 6,566,450 B2 | 5/2003 | Debras et al. | |
| 6,576,306 B2 | 6/2003 | Mehta et al. | |
| 6,576,329 B2 | 6/2003 | Kong | |
| 6,583,209 B2 | 6/2003 | Mehta et al. | |
| 6,583,227 B2 | 6/2003 | Mehta et al. | |
| 6,623,866 B2 * | 9/2003 | Migliorini et al. | 428/516 |
| 6,706,342 B2 * | 3/2004 | Kong et al. | 428/34.1 |
| 6,821,592 B2 | 11/2004 | Rodick | |
| 6,835,462 B2 | 12/2004 | Sun et al. | |
| 6,887,582 B2 | 5/2005 | Lee et al. | |
| 6,939,602 B2 * | 9/2005 | McGee et al. | 428/220 |
| 6,982,311 B2 | 1/2006 | Karande et al. | |
| 7,217,463 B2 | 5/2007 | Henderson | |
| 2001/0018125 A1 | 8/2001 | Shibuya et al. | |
| 2001/0039314 A1 | 11/2001 | Mehta et al. | |
| 2001/0041776 A1 | 11/2001 | Lai et al. | |
| 2001/0044506 A1 | 11/2001 | Mehta et al. | |
| 2002/0006520 A1 | 1/2002 | Rasp et al. | |
| 2002/0028340 A1 | 3/2002 | Fujii et al. | |
| 2002/0065384 A1 | 5/2002 | Knight et al. | |
| 2002/0160170 A1 | 10/2002 | Ishige et al. | |
| 2003/0049436 A1 | 3/2003 | Hager et al. | |
| 2003/0072957 A1 | 4/2003 | Lee et al. | |
| 2003/0078357 A1 | 4/2003 | Lai et al. | |
| 2003/0114579 A1 | 6/2003 | Mori et al. | |
| 2003/0157313 A1 | 8/2003 | Shibuya et al. | |
| 2003/0203230 A1 | 10/2003 | Pellingra et al. | |
| 2004/0033349 A1 * | 2/2004 | Henderson | 428/304.4 |
| 2004/0110019 A1 | 6/2004 | Schubert et al. | |
| 2004/0224175 A1 * | 11/2004 | Henderson | 428/515 |
| 2005/0031824 A1 | 2/2005 | Rodick | |
| 2005/0037191 A1 | 2/2005 | Ikenoya | |
| 2005/0048303 A1 * | 3/2005 | Henderson et al. | 428/516 |
| 2005/0129811 A1 | 6/2005 | Kraimer et al. | |
| 2005/0214558 A1 | 9/2005 | Rodick | |
| 2006/0040100 A1 | 2/2006 | Nemoto et al. | |
| 2006/0057410 A1 | 3/2006 | Saavedra et al. | |

FOREIGN PATENT DOCUMENTS

| | | |
|---|---|---|
| EP | 0341091 | 11/1989 |
| EP | 0377289 | 7/1990 |
| EP | 0950511 | 4/1999 |
| EP | 0956947 | 11/1999 |
| JP | 52-109580 | 9/1977 |
| JP | 60-178132 | 9/1985 |
| JP | 62-121709 | 6/1987 |
| WO | 90/00788 | 1/1990 |
| WO | 93/03093 | 2/1993 |
| WO | 95/01397 | 1/1995 |
| WO | 95/32242 | 11/1995 |
| WO | 96/21557 | 7/1996 |
| WO | 97/01440 | 1/1997 |
| WO | 97/08238 | 3/1997 |
| WO | 98/01285 | 1/1998 |
| WO | 00/58090 | 10/2000 |
| WO | 01/70484 | 9/2001 |
| WO | 02/084343 | 10/2002 |
| WO | 03/011584 | 2/2003 |
| WO | 2004/003874 | 1/2004 |
| WO | 2005/097492 | 10/2005 |

OTHER PUBLICATIONS

Huntsman, product data sheet for P5M4K-046, May 2002 (1 page).
Exxonmobil Chemical, product data sheet for EXACT 4151, Oct. 15, 1999 (1 page).
Webpage printout from www.polymersdatabase.com for VLDPE printed Jul. 29, 2003, copyright notice 2000, CRC Press, pp. 1-4 (4 pages).
Webpage printout from www.polymersdatabase.com for LDPE printed Jul. 29, 2003, copyright notice 2000, CRC Press, pp. 1-9 (9 pages).
Webpage printout from www.polymersdatabase.com for LLDPE printed Jul. 29, 2003, copyright notice 2000, CRC Press, pp. 1-10 (10 pages).
Webpage printout from www.polymersdatabase.com for MDPE printed Jul. 29, 2003, copyright notice 2000, CRC Press, pp. 1-5 (5 pages).
Webpage printout from www.polymersdatabase.com for Polyethylene, High Density printed Jul. 29, 2003, copyright notice 2000, CRC Press, pp. 1-13 (13 pages).
Webpage printout from www.polymersdatabase.com for Ultra High Molecular Weight PE printed Jul. 29, 2003, copyright notice 2000, CRC Press, pp. 1-6 (6 pages).
EP 03 01 4616; European Search Report mailed Sep. 26, 2003.
Written Opinion mailed May 15, 2006 in corresponding International Application No. PCT/US03/20281.
PCT/US03/20281; PCT International Search Report mailed Jan. 22, 2004.
M. Tanaka; High Value Added Film Using an Olefin Based Elastomer; Specialty Plastics Conference, Zuerich, Dec. 3-4, 1990.
TAFMER® "A"—A New Polyolefin Resin With Excellent Flexibility, Mitsui Petrochemical Industries, Jan. 1977 (Mitsui, 1977).
TAFMER® "P"—A New-Type Elastomer as Plastics Modifying Agent Supplied in Pellet Form, Mitsui Petrochemical Industries, Aug. 1975 (Mitsui, 1975).
PCT/US02/24368; PCT International Search Report mailed Dec. 12, 2002.
PCT/US2007/073674; PCT International Search Report mailed Dec. 21, 2007.
EP 02 76 1212; Supplementary European Search Report dated May 14, 2007.

* cited by examiner

ASYMMETRIC MULTILAYERED POLYMERIC FILM AND LABEL STOCK AND LABEL THEREOF

CROSS REFERENCE TO RELATED APPLICATIONS

This application claims the benefit of U.S. Provisional Application No. 60/807,554 filed Jul. 17, 2006.

FIELD OF THE INVENTION

This invention is related to an asymmetric multilayered polymeric film for labeling articles and is further related to an adhesive containing label stock and adhesive label comprising the polymeric film.

BACKGROUND OF THE INVENTION

Adhesive labels find extensive use in labeling articles of commerce to include plastic, paper, metal and glass containers for various consumer and industrial products. Because of this extensive use of adhesive labels, improvements in the service performance of adhesive labels and/or in the processing to prepare adhesive labels is beneficial.

SUMMARY OF THE INVENTION

The present invention involves, in one embodiment, an asymmetric multilayer polymeric film for labeling articles that comprises (A) a print skin layer having an upper surface and a lower surface and comprising at least one polyethylene having a density of up to 0.94 g/cm$^3$ and at least one polypropylene, (B) a core layer having an upper surface and a lower surface and comprising at least one polypropylene copolymer, at least one polypropylene homopolymer, and at least one polyethylene prepared by Ziegler-Natta or metallocene catalysis and having a density ranging from 0.86 to 0.98 g/cm$^3$, and (C) an adhesive skin layer having an upper surface and a lower surface and comprising at least one polyolefin grafted with an unsaturated carboxylic acid or unsaturated carboxylic acid derivative wherein the lower surface of the print skin layer (A) overlies the upper surface of the core layer (B), and the upper surface of the adhesive skin layer (C) underlies the lower surface of the core layer (B).

In another embodiment, the adhesive skin layer (a) also contains at least one propylene homopolymer.

In another embodiment of the invention the multilayer polymeric film further comprises (D) a tie layer having an upper surface and a lower surface and comprising at least one polypropylene copolymer, at least one polypropylene homopolymer, and at least one polyethylene prepared by Ziegler-Natta or metallocene catalysis and having a density ranging from 0.86 to 0.98 g/cm$^3$ wherein the upper surface of the tie layer is in contact with the lower surface of the print skin layer (A) and the lower surface of the tie layer is in contact with the upper surface of the core layer (B), and the core layer (B) further comprises recycled film.

In another embodiment of this invention an adhesive containing label stock comprises the multilayer polymeric film comprising layers (A), (D), (B) (C), and (E) an adhesive layer having an upper surface and a lower surface wherein the upper surface of the adhesive layer is adhesively joined to the lower surface of the adhesive skin layer (C) of the film.

A further embodiment of the invention is an adhesive label which is die-cut from an adhesive containing label stock where the label stock comprises the polymeric film comprising layers (A), (D), (B), (C), the adhesive layer (E), and a release liner (F) wherein the release liner is releasably joined to the lower surface of the adhesive layer (E), and the adhesive layer (E) is a pressure sensitive adhesive layer.

The multilayered polymeric film of this invention has been found to improve both the service performance of adhesive labels and the processing to prepare adhesive labels which comprise the polymeric film due to the asymmetric layer structure of the film.

DETAILED DESCRIPTION OF THE INVENTION

Figure 1:
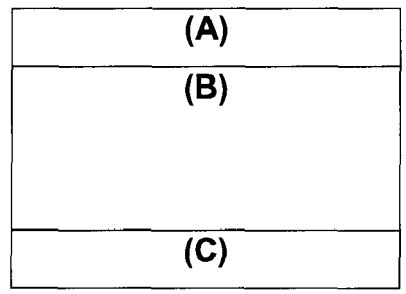
FIG. 1. is a cross sectional view of a polymeric film of the present invention comprising three layers.

In one embodiment of this invention, a multilayer polymeric film comprises (A) a print skin layer having an upper surface and a lower surface, (B) a core layer having an upper surface and a lower surface, and (C) an adhesive skin layer having an upper surface and a lower surface where the lower surface of the print skin layer (A) overlies the upper surface of the core layer (B), and the upper surface of the adhesive skin layer (C) underlies the lower surface of the core layer (B). In another embodiment of the invention the polymeric film, which comprises layers (A) and (B) and (C), further comprises (D) a tie layer having an upper surface and a lower surface where the upper surface of the tie layer is in contact with the lower surface of the print skin layer (A) and the lower surface of the tie layer is in contact with the upper surface of the core layer (B). The terms overlie and underlie mean that a first layer overlying or underlying a second layer can partially or fully cover the second layer and that the first layer can be in direct contact with the second layer or that one or more intermediate layers can be between the first layer and the second layer. The term asymmetric as used herein means that the compositions of each of the layers of the multilayer film are different.

(A) Print Skin Layer

The print skin layer (A) comprises at least one polyethylene (PE) and at least one polypropylene (PP). The polyethylene comprises a polyethylene having a density ranging up to about 0.94 g/cm$^3$, or from about 0.86 or 0.87 to about 0.94 g/cm$^3$. The polyethylene can comprise a very low density polyethylene (VLDPE), a low density polyethylene (LDPE), a linear low density polyethylene (LLDPE), a medium density polyethylene (MDPE), or a mixture of any of the foregoing polyethylenes. The mixture of polyethylenes can comprise two or more polyethylenes of the same type such as for example a mixture of two linear low density polyethylenes or can comprise two or more polyethylenes taken from two or more different types such as for example a mixture of a LLDPE and a MDPE. A VLDPE generally has a density ranging from 0.88 to 0.915 g/cm$^3$ and can comprise a polyethylene copolymer prepared via metallocene or Ziegler-Natta (Z-N) catalysis from ethylene and an alpha-olefin comonomer having 3 to 20 carbon atoms where the comonomer content is above 4 to 25 mole %. In general the metallocene catalyst gives more uniform branching and more homogeneity in the polymer compared to the Z-N catalyst. A LDPE generally has a density ranging from 0.86 or 0.87 to 0.935 and can comprise a polyethylene homopolymer, a polyethylene copolymer from ethylene and one or more $C_3$-$C_{20}$ alpha-olefin comonomers, or a mixture of any of the foregoing polymers where the LDPE is prepared under high pressure using free radical catalysis. A LDPE has short chain and long chain branching. A LLDPE generally has a density ranging from 0.86 or 0.87 to 0.93 g/cm$^3$ and can comprise a polyethylene copolymer prepared from ethylene and one or more $C_3$-$C_{20}$ alpha-olefin comonomers using Z-N or metallocene catalysis where the comonomer content is 2.5 to 3.5 mole %. A LLDPE has short chain branching. A MDPE generally has a density ranging from 0.925 to 0.94 g/cm$^3$ and can comprise a polyethylene copolymer prepared from ethylene and one or more $C_3$-$C_{20}$ alpha-olefin comonomers using Z-N or metallocene catalysis where the comonomer content is 1-2 mole %. The print skin layer (A) in an embodiment of the invention comprises a low viscosity LLDPE from Ziegler-Natta catalysis and a LLDPE from metallocene catalysis. The low viscosity LLDPE from Z-N catalysis can have a melt index by ASTM Method D1238 in g/10 minutes at 190° C./2.16 kg of 3-40, 5-30, or 7-20. The polyethylenes described hereinabove are available from resin suppliers such as Dow Chemical Co. and Exxon-Mobil Chemical Co. Specific examples of useful Z-N polyethylenes include Dowlex 2517 from Dow; L2101 or L8148 (melt index of 0.9) and Marflex 7105 DL (melt index of 0.5) from Chevron Phillips from Huntsman. Dowlex 2517 has a density of 0.917 g/cc and melt index of 25 g/10 min, and L2101 has a melt index of 24 g/10 min. Examples of metallocene catalyzed LLDPEs include Exxon-Mobil EXACT 4049, (density 0.873 g/cc and a melt index of 4.5 g/10 min); and Dow AFFINITY 8200G (density of 0.870 g/cc) and AFFINITY KC8852 (melt index of 3.0).

The print skin layer (A) also comprises at least one polypropylene which, in one embodiment, has a melt index by ASTM Method D1238 in g/10 minutes at 230° C./2.16 kg of 1-40, 2-30, or 4-20. The polypropylene can comprise a polypropylene homopolymer, a polypropylene copolymer, or a mixture of any of the foregoing polymers. The polypropylene can be prepared using a Z-N or metallocene catalyst.

A number of useful propylene homopolymers are available commercially from a variety of sources. Some of the useful homopolymers are listed and described in the following Table I.

TABLE I

Commercial Propylene Homopolymers

| Commercial Designation | Company | Melt Flow g/10 min | Density (g/cm3) |
| --- | --- | --- | --- |
| 5390N | Dow Chemical | 12.0 | 0.90 |
| SE66R | Dow Chemical | 8.8 | 0.90 |
| H7010 | Dow Chemical | 12 | NA |
| 3622 | Atofina | 12.0 | 0.90 |
| 3576X | Atofina | 9.0 | 0.90 |
| Moplen HP400N | Basell | 12.0 | 0.90 |
| P4G4K-038* | Huntsman | 12 | 0.90 |
| P464K-173X* | Huntsman | 12 | 0.90 |
| 9074*MED | Exxon Mobil | 24 | 0.90 |

*contains a nucleating agent

In another embodiment, the polypropylene may be a propylene copolymer, and the propylene copolymers comprise polymers of propylene and up to about 40% by weight of at least one alpha-olefin selected from ethylene and alpha-olefins containing from 4 to about 12, or from 4 to about 8 carbon atoms. Examples of useful alpha-olefins include ethylene, 1-butene, 1-pentene, 4-methyl-1-pentene, 1-hexene, 1-heptene, and 1-octene. In one embodiment, the polymers of propylene which are utilized in the present invention comprise polymers of propylene with ethylene, 1-butene, 1-hexene or 1-octene. The propylene alpha-olefin polymers useful in the present invention include random as well as block copolymers although the random copolymers generally are particularly useful. In one embodiment, the films are free of impact copolymers. Blends of two or more propylene copolymers as well as blends of the propylene copolymers with propylene homopolymers can be utilized.

In one embodiment, the propylene copolymers are propylene-ethylene copolymers with ethylenic contents from about 0.2% to about 10% by weight. In another embodiment, the ethylene content is from about 3% to about 10% by weight, or from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-hexene copolymers may contain up to about 35% by weight 1-hexene. In one embodiment, the amount of 1-hexene is up to about 25% by weight. Propylene-1-octene copolymers useful in the present invention may contain up to about 40% by weight of 1-octene. More often, the propylene-1-octene copolymers will contain up to about 20% by weight of 1-octene.

The propylene copolymers useful in preparing the film facestock of the present invention may be prepared by techniques well known to those skilled in the art, and many such copolymers are available commercially. For example, the copolymers useful in the present invention may be obtained by copolymerization of propylene with an alpha-olefin such as ethylene or 1-butene using single-site metallocene catalysts.

A list of some useful commercially available propylene copolymers is found in the following Table II.

TABLE II

Commercial Propylene Copolymers

| Commercial Name | Source | % Ethylene | % 1-Butene | Melt Flow Rate (g/10 mins) | Density (g/cm$^3$) |
| --- | --- | --- | --- | --- | --- |
| DS4D05 | Dow Chemical | — | 14 | 6.5 | 0.890 |
| DS6D20 | Dow Chemical | 3.2 | — | 1.9 | 0.890 |
| DS6D81 | Dow Chemical | 5.5 | — | 5.0 | 0.90 |
| SR4-189 | Dow Chemical | — | 8 | 5.7 | 0.90 |
| P5M2K-070X | Huntsman | 3.2 | — | — | 0.90 |
| TR3120C | Sunoco | NA | — | 12 | NA |
| R771-10N | Dow Chemical | NA | — | 10 | NA |

In one embodiment, the print skin comprises on a weight basis, from about 60% to about 90% of at least one polyethylene and from about 10% to about 40% of at least one polypropylene. In another embodiment, the print skin layer comprises from about 70% to about 90% of at least one polyethylene and from about 10 to about 30% of at least one polypropylene. In another embodiment the print skin layer comprises from about 37-53% of a low viscosity ZN LLDPE, about 23-37% of a metallocene LLDPE and about 10-40% of a propylene homopolymer.

The print skin layer (A) can further comprise one or more additional thermoplastic polymers. The one or more additional thermoplastic polymers can comprise polyolefins other than polyethylenes and polypropylenes, alkene-unsaturated carboxylic acid or unsaturated carboxylic acid derivative copolymers, styrene-based polymers or copolymers, polyurethanes, poly(vinyl chloride)s, polycarbonates, polyamides, fluoroplastics, poly(meth)acrylates, polyacrylonitriles, polyesters, or a mixture of any of the foregoing polymers.

The print skin layer (A) can further comprise one or more additives as described in U.S. Pat. No. 6,821,592. The one or more additives can comprise a nucleating agent, an antiblock agent, a processing aid, a slip agent, an antistatic agent, a pigment, a cavitating agent, an inorganic filler, an antioxidant, or a mixture of any of the foregoing additives.

In one embodiment, the polypropylenes may be nucleated and they may contain one or more nucleating agents. In a particularly useful embodiment, the nucleating agent is blended into the propylene polymers. Various nucleating agents can be incorporated into the film formulations of the present invention, and the amount of nucleating agent added should be an amount sufficient to provide the desired modification of the crystal structure while not having an adverse effect on the desired optical properties of the film. It is generally desired to utilize a nucleating agent to modify the crystal structure and provide a large number of considerably smaller crystals or spherulites to improve the transparency (clarity) of the film. The amount of nucleating agent added to the film formulation should not have a deleterious affect on the clarity of the film. The amounts of nucleating agent incorporated into the film formulations of the present invention are generally quite small and range from about 500, or from about 750 or from about 850 ppm. The nucleating agents may be present in an amount up to 5000, or up to about 3000, or up to about 1000.

Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Wijga in U.S. Pat. Nos. 3,207,735, 3,207,736, and 3,207,738, and Wales in U.S. Pat. Nos. 3,207,737 and 3,207,739, all patented Sep. 21, 1966, suggest that aliphatic, cycloaliphatic, and aromatic carboxylic, dicarboxylic or higher polycarboxylic acids, corresponding anhydrides and metal salts are effective nucleating agents for polyolefin. They further state that benzoic acid type compounds, in particular sodium benzoate, are the best embodiment of the nucleating agents.

In one embodiment, the nucleating agents are sorbitol derivatives or organic phosphates. Substituted sorbitol derivatives such as bis(benzylidene) and bis(alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

Other acetals of sorbitol and xylitol are typical nucleators for polyolefins and other thermoplastics as well. Dibenzylidene sorbitol (DBS) was first disclosed in U.S. Pat. No. 4,016,118 by Hamada, et al. as an effective nucleating and clarifying agents for polyolefin. Since then, large number of acetals of sorbitol and xylitol have been disclosed. Representative US patents include: Kawai, et al., U.S. Pat. No. 4,314,039 on di(alkylbenzylidene) sorbitols; Mahaffey, Jr., U.S. Pat. No. 4,371,645 on di-acetals of sorbitol having at least one chlorine or bromine substituent; Kobayashi, et al., U.S. Pat. No. 4,532,280 on di(methyl or ethyl substituted benzylidene) sorbitol; Rekers, U.S. Pat. No. 5,049,605 on bis(3,4-dialkylbenzylidene) sorbitols including substituents forming a carbocyclic ring. These patents are hereby incorporated by reference.

Another class of nucleating agents described by Nakahara, et al. in U.S. Pat. No. 4,463,113, in which cyclic bis-phenol phosphates was disclosed as nucleating and clarifying agents for polyolefin resins. Kimura, et al. then describes in U.S. Pat. No. 5,342,868 that the addition of an alkali metal carboxylate to basic polyvalent metal salt of cyclic organophosphoric ester can further improve the clarification effects of such additives. Compounds that are based upon this technologies are marketed under the trade name NA-11 and NA-21. These patents are hereby incorporated by reference.

The nucleating agent is generally introduced into a layer of the film as part of a thermoplastic polymer as obtained from a resin supplier. In several embodiments of the invention a nucleating agent is present in one layer of the film which can comprise the core layer or one of the skin layers, or is present in any combination of two or more layers of the film.

The antiblock agent can comprise a concentrate of about 3 to 80% by weight of an inorganic mineral or organic compound in a thermoplastic polymer matrix such as for example 5% by weight of an amorphous silica in a polyolefin matrix. In another example, the antiblocking agent may comprise from about 2% to 10% of an acrylate polymer in a polyolefin. An example of such an antiblocking agent is Ampacet 401960 which comprises about 5% by weight of polymethylmethacrylate (PMMA) in propylene homopolymer. In one embodiment the skin layer may contain from about 1 to about 10% of an antiblocking agent. In another embodiment, the antiblock agent can be present in one or more layers of the polymeric film of this invention at a range of about 100 to 10,000 or 200 to 5,000 or 300 to 1,000 ppm by weight based on the weight of the layer. Antiblock agents as well as slip agents, processing aids and antistatic agents provide improvement in performance to a film and derivative label due to surface properties. Consequently when present in the film, these additives are generally present in one or both of the skin layers.

The pigment can comprise an inorganic pigment comprising titanium dioxide, calcium carbonate, talc, an iron oxide, a carbon black, or a mixture of any of the foregoing inorganic pigments; an organic pigment; or a mixture of any of the foregoing pigments. The pigment can comprise a concentrate of about 20 to 80% by weight of an inorganic pigment and/or organic pigment in a thermoplastic matrix. The pigment concentrate can be present in one or more layers of the polymeric film of this invention at a range of about 0.5 to 20% by weight based on the weight of the layer to provide color to and/or opacify the film. An opaque film will generally have an opacity of at least 70%, at least 75%, or at least 80%. The pigment concentrate is generally in the core layer when present in the film.

In one embodiment of the invention, the print skin layer (A) comprises on a weight basis 35-55% of a low viscosity Z-N LLDPE, 20-40% of a metallocene LLDPE, 10-30% of a polypropylene homopolymer and 1-10% of an antiblock concentrate.

The polyethylene-polypropylene blend in the print skin layer (A) of the inventive film provides a surface that has abrasion resistance for a derivative label and that is receptive to multiple printing technologies to include UV cured inks, water based inks, solvent based inks, thermal transfer inks and hot foil stamping. Printing inks will adhere to the surface of the print skin layer (A) without the need for a special coating that allows an ink to adhere although a special coating can be applied to further increase performance.

(B) Core Layer

The core layer comprises at least one polypropylene copolymer, at least one polypropylene homopolymer and at least one polyethylene prepared by Ziegler-Natta or metallocene catalysis and having a density ranging from 0.86 or 0.87 to 0.98 $g/cm^3$. The polypropylene copolymer and homopolymer can comprise the polypropylenes as described hereinabove in the section on print skin layer (A). The polypropylene copolymer can comprise a polypropylene random copolymer containing 1-7% by weight of an alpha-olefin comonomer to include ethylene and $C_4$-$C_{20}$ alpha-olefins where the copolymer is generally prepared with a Z-N catalyst. In another embodiment of the invention the core layer comprises a polypropylene random copolymer and a polypropylene homopolymer, or a nucleated polypropylene random copolymer and a polypropylene homopolymer where the comonomer of the polypropylene random copolymer is ethylene.

The polyethylenes used in the core layer can comprise polyethylene prepared by Ziegler-Natta or metallocene catalysis and having a density ranging from 0.86 or 0.87 to 0.98 $g/cm^3$. In another embodiment, the polyethylene used in the core layer have densities of from about 0.87 to about 0.92. The polyethylene of the core layer can comprise a LLDPE, a MDPE, a high density polyethylene (HDPE), or a mixture of any of the foregoing polyethylenes. The core layer can comprise a LLDPE or MDPE as described hereinabove in the section on print skin layer (A). The core layer can comprise a HDPE generally having a density ranging from above 0.94 to 0.98 $g/cm^3$. The HDPE can comprise a polyethylene homopolymer, a polyethylene copolymer generally containing less than 5 mole % of a $C_3$-$C_{20}$ comonomer, or a mixture of any of the foregoing polymers. The HDPE can be prepared with a transition metal catalyst to include Z-N and metallocene catalysts. In embodiments of the invention the core layer comprises a LLDPE or a LLDPE prepared by metallocene catalysis.

The core layer can comprise one or more additional thermoplastic polymers and/or one or more additives as described above in the section on print skin layer (A). In an embodiment of the invention the core layer does not contain an opacifying pigment, and the film is clear having an opacity of less than 10%, less than 8%, or less than 6%. In another embodiment of the invention the core layer contains an opacifying pigment, and the film is opaque having an opacity of at least 70%, at least 75%, or at least 80%.

In one embodiment of the invention, the core layer comprises from about 50% to about 85% of at least one propylene copolymer, from about 5% to about 25% of at least one propylene homopolymer and from about 5% to about 25% of at least one polyethylene.

In another embodiment of the invention the core layer comprises from about 70% to about 85% of the polypropylene copolymer, about 5 to about 25% of the polypropylene homopolymer, and about 5 to about 25% of the linear low density polyethylene.

In yet another embodiment, the core layer comprises from about 65-75% by weight of at least one propylene copolymer, from about 10-20% by weight of at least one propylene homopolymer and from about 10-20% weight of at least one polyethylene.

In another embodiment of the invention the core layer comprises on a weight basis 50-90% of a polypropylene copolymer, 5-25% of a polypropylene homopolymer and 5-25% of a polyethylene prepared by Ziegler-Natta or metallocene catalysis and having a density ranging from 0.86 or 0.87 to 0.98 $g/cm^3$.

The core layer may also contain up to about 15% or even 20% by weight of one or more pigments. Any of the pigments described above can be used.

The polypropylene-polyethylene blend in the core layer (B) of the inventive film allows the film to have the stiffness and tensile strength required for label processing while improving die-cutting by giving cleaner cutting and reduced die work to complete a cut for dies to include rotary dies.

In another embodiment of the invention the core layer (B) can further comprise recycled film wherein the inventive film in one embodiment further comprises a tie layer (D) as described later in the Detailed Description. The recycled film can comprise trim or scrap from previously prepared inventive film where the trim or scrap can be reground or repelletized prior to being recycled with fresh core layer resins. The recycled film can be used in the core as a replacement for fresh blended resins on a weight basis at 0.5-20%, 1-10%, or 1-7%. Since recycled film generally comprises mainly core resins, use of recycled film in a core layer can be advantageous in eliminating losses due to scrap and trim. The recycled film can be used on a replacement basis for one or more of the core layer resins which comprise at least one propylene copolymer, at least one propylene homopolymer and at least one polyethylene having a density of from about 0.915 to 0.95 g/cc. In one embodiment of the invention, the recycled film is used as a replacement for each of the core polymers.

(C) Adhesive Skin Layer

The adhesive skin layer comprises at least one polyolefin grafted with an unsaturated carboxylic acid or unsaturated carboxylic acid derivative. The polyolefin can comprise a polyolefin homopolymer prepared from a $C_2$-$C_{20}$ alkene such as for example polyethylene and polypropylene and polyisobutylene, a polyolefin copolymer prepared from two or more $C_2$-$C_{20}$ alkenes such as for example an ethylene-propylene copolymer, or a mixture of any of the foregoing polymers. The unsaturated carboxylic acid or unsaturated carboxylic acid derivative can be any organic compound containing at least one carbon to carbon double bond and a carboxylic acid group or derivative thereof to include esters and anhydrides. The unsaturated carboxylic acid or unsaturated carboxylic acid derivative can comprise for example maleic acid, fumaric acid, itaconic acid, acrylic acid, methyl acrylate, or maleic anhydride. The polyolefin can be grafted with the unsaturated carboxylic acid or derivative thereof via a free radical reaction, a thermal reaction at elevated temperatures above about 180° C., or via an extrusion reactor as described in U.S. Pat. No. 6,300,419. The content of the carboxylic acid or acid derivative in the grafted polyolefin can be 0.1-10% by weight. In an embodiment of the invention the adhesive skin layer comprises a maleic anhydride grafted polypropylene. Grafted polyolefins are available from several suppliers to including Equistar and DuPont. Specific examples of useful grafted polyolefins include Admer QF551A (melt flow rate of 5.0) from Mitsui, Plexar PX6006 (melt flow rate of 4.0) from Equistar, and Bynel 50E561 (melt flow rate of 4) from DuPont.

The adhesive skin layer also can comprise one or more additional thermoplastic polymers and/or one or more additives as described above in the section on print skin layer (A). In one embodiment the adhesive skin layer comprises, in addition to the grafted polyolefin, at least one propylene homopolymer. Any of the propylene homopolymers described above is useful in the print skin layer can be used in the adhesive skin layer. In one embodiment the adhesive skin layer may contain from about 10 to about 90% by weight of the grafted polyolefin described above and from 10 to 90% by weight of at least one propylene homopolymer.

In an embodiment of the invention the adhesive skin layer comprises an antiblock concentrate as described above.

In an embodiment of the invention the adhesive skin layer comprises on a weight basis 10-80% of a polyolefin grafted with an unsaturated carboxylic acid or unsaturated carboxylic acid derivative, 15 to 85% of a propylene homopolymer, and 1-10% of an antiblock concentrate.

The grafted polyolefin of the adhesive skin layer improves die-cutting by allowing for a clean break against a release liner, which is described later in the Description, at the termination of a die-cut. The grafted polyolefin of the adhesive skin layer also provides a surface for adherence or anchorage of an adhesive without the need for a special coating that allows an adhesive to adhere although a special coating can be applied to further increase performance. The anchorage of the adhesive on the adhesive skin layer is sufficient so that repositioning of derivative labels is possible since adhesive transfer is minimal.

(D) Tie Layer

In an embodiment of the invention when the core layer (B) of the inventive film further comprises recycled film, the inventive film further comprises a tie layer (D) comprising at least one polypropylene copolymer, at least one polypropylene homopolymer, and at least one polyethylene prepared by Ziegler-Natta or metallocene catalysis having a density ranging from 0.86 to 0.98 g/cm$^3$. In one embodiment, the tie layer has the same general composition as the core layer as described above except that the tie layer does not comprise recycled film. The tie layer also provides stiffness, tensile strength and die-cutting performance.

Film Construction and Processing

The layers of the multilayered polymeric film of the present invention can be prepared by steps comprising extrusion of a layer from a linear or annular die, by coextrusion of two or more layers from a linear or annular die, by lamination of two or more previously formed layers, or any combination of the foregoing steps.

In an embodiment of the invention the film is prepared by coextrusion from a linear die.

In one embodiment the polymeric film can subsequently be oriented by stretching it biaxially in the machine direction (direction the film is advanced during film manufacture) and transverse direction (direction normal or perpendicular to the machine direction) or uniaxially in the machine direction. In an embodiment of the invention, the film is oriented in the machine direction only by stretching it from about 2 to 9 times, 3 to 9 times, or 4 to 6 times. The oriented film can also be heat set or annealed to provide dimensional stability to the film to prevent or minimize shrinking or distortion. Coextrusion, orientation and annealing procedures which can be used to manufacture a film are described in U.S. Pat. No. 7,217,463. The film can also be treated on the surface of the print skin layer (A) or the surfaces of both the print skin layer (A) and the adhesive skin layer (C) to further improve adhesion of an ink or an adhesive to a skin layer. Surface treatments can comprise corona discharge treatment, flame treatment, plasma treatment, coating with an ink- or adhesive-receptive material such as an acrylic coating, or a combination of any of the foregoing treatments. In embodiments of the invention the film is corona treated on one or both skin surfaces, or the film is flame treated on one or both skin surfaces.

Orienting a film in the machine direction only generally increases the tensile modulus or stiffness in the machine direction. This increased machine direction stiffness provides a label, prepared from the film, with proper dispensability and good print registration in the labeling of articles. This film, oriented in the machine direction only, generally has a substantially lower tensile modulus or stiffness in the transverse direction (TD) compared to the machine direction (MD) which provides a derivative label with good conformability to the surface of an article to be labeled. In embodiments of the invention the TD to MD tensile modulus ratio is less than 0.75, 0.65, or 0.6.

The film, following manufacture, which can comprise for example coextrusion or coextrusion and orientation, can have a total thickness ranging from 0.5-10 mils (12.7-254 micrometers), 1-7 mils (25.4-177.8 micrometers), or 1.5-4 mils (38.1-101.6 micrometers). The core layer (B) or the core layer (B) and the tie layer (D) combined are generally significantly thicker than the skin layers (A) and (C). In an embodiment of the invention the skin layers are thin to allow for conformability and clarity of the film. The skin layers can be 1-20%, 2-15%, 2-8% of the thickness of the film. The core layer or the combined core layer and tie layer can be 60-98%, 70-96%, or 84-96% of the thickness of the film. The tie layer can be 0.1-0.5 times the thickness of the core layer.

Figure 2:
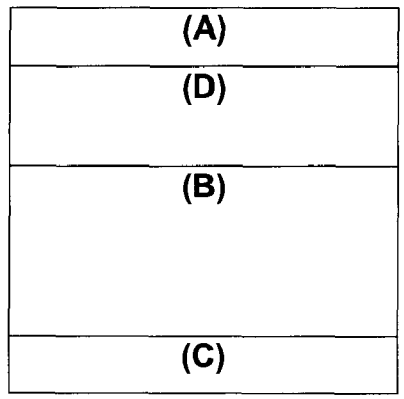
FIG. 2. is a cross sectional view of a polymeric film of the present invention comprising four layers.

FIGS. 1 and 2 illustrate the polymeric film of the present invention in which thin skin layers (A) and (C) respectively overlie and underlie a thick core layer (B) or a thick combined tie layer (D) and core layer (B).

FILM EXAMPLES

The following nonlimiting examples further describe and illustrate some embodiments of the present invention.

Example 1

A 2.5 mil (63.5 micrometers) film is prepared by coextrusion, machine direction orientation and annealing to provide for dimensional stability. Print skin layer (A) is 4% of the film thickness and comprises on a weight basis 47% of a Z-N LLDPE Dowlex 2517, 28% of a metallocene LLDPE EXACT 4049, 21% of a nucleated polypropylene homopolymer P4G4K-173X and 5% of an antiblock concentrate Ampacet 401960.

Core layer (B) is 92% of the film thickness and comprises on a weight basis 70% of a nucleated polypropylene random copolymer P5M2K-070X, 15% of a metallocene LLDPE EXACT 4049, and 15% of a nucleated polypropylene homopolymer P4G4K-173X.

Adhesive skin layer (C) is 4% of the film thickness and comprised on a weight basis 97% of a maleic anhydride grafted polypropylene Plexar PX6006 and 3% of an antiblock concentrate Ampacet 401960.

Example 2

A 2.5 mil (63.5 micrometers) film is prepared by coextrusion, machine direction orientation and annealing to provide for dimensional stability. Print skin layer (A) is 4% of the film thickness and comprises on a weight basis 46% of Huntsman L2101, 28% of a metallocene LLDPE AFFINITY 8200G, 21% of a nucleated polypropylene homopolymer Dow H7010-12NA and 5% of an antiblock concentrate Ampacet 401960.

Core layer (B) is 92% of the film thickness and comprises on a weight basis 68% of a nucleated polypropylene random copolymer P5M2K-070X, 14.5% of a metallocene LLDPE AFFINITY 8200G, 14.5% of a nucleated polypropylene homopolymer P4G4K-173X, and 3% of a pigment concentrate.

Adhesive skin layer (C) is 4% of the film thickness and comprises on a weight basis 97% of a maleic anhydride grafted polypropylene Plexar PX6006 and 3% of an antiblock concentrate Ampacet 401960.

The film is opaque having an opacity of at least 70%.

Example 3

A 2.5 mil (63.5 micrometers) film is prepared by coextrusion, machine direction orientation and annealing to provide for dimensional stability. Print skin layer (A) is 4% of the film thickness and comprises on a weight basis 47% of Dowlex 2517, 27% of a EXACT 4049, 21% of a nucleated polypropylene homopolymer P4G4K-173X and 5% of an antiblock concentrate Ampacet 401960.

Tie layer (D) is 22% of the film thickness and comprises on a weight basis 70% of a nucleated polypropylene random copolymer P5M2K-070X, 15% of a metallocene LLDPE EXACT 4049, and 15% of a nucleated polypropylene homopolymer P4G4K-173X.

Core layer (B) is 70% of the film thickness and comprises on a weight basis 62% of a nucleated polypropylene random copolymer, P5M2K-070X 13% of a metallocene LLDPE EXACT 4049, 13% of a nucleated polypropylene homopolymer P4G4K-173X, and 12% of recycled film.

Adhesive skin layer (C) is 4% of the film thickness and comprises on a weight basis 97% of a maleic anhydride grafted polypropylene Admer QF551A and 3% of an antiblock concentrate Ampacet 401960.

Example 4

A 2.5 mil (63.5 micrometers) film is prepared by coextrusion, machine direction orientation and annealing to provide for dimensional stability. Print skin layer (A) is 4% of the film thickness and comprises on a weight basis 46% of Dowlex 2517, 28% of a metallocene LLDPE EXACT 4049, 21% of a nucleated polypropylene homopolymer P4G4K-173X and 5% of an antiblock concentrate Ampacet 401960.

Tie layer (D) is 22% of the film thickness and comprises on a weight basis 70% of a nucleated polypropylene random copolymer P5M2K-070X, 15% of a metallocene LLDPE EXACT 4049, and 15% of a nucleated polypropylene homopolymer P4G4K-173X.

Core layer (B) is 70% of the film thickness and comprises on a weight basis 64% of a nucleated polypropylene random copolymer P5M2K-070X, 14% of a metallocene LLDPE EXACT 4049, 14% of a nucleated polypropylene homopolymer P4G4K-173X, 5% of recycled film, and 3% of a pigment concentrate.

Adhesive skin layer (C) is 4% of the film thickness and comprises on a weight basis 97% of a maleic anhydride grafted polypropylene Admer QF551A and 3% of an antiblock concentrate Ampacet 401960. The film is opaque having an opacity of at least 70%.

Example 5

A 2.5 mil (63.5 micrometers) film is prepared by coextrusion, machine direction orientation, annealing to provide for dimensional stability, and corona discharge treatment of the print skin layer.

Print skin layer (A) is 4.5% of the film thickness and comprises on a weight basis 47% of LLDPE Dow Dowlex 2517, 27% of a polyethylene plastomer ExxonMobil EXACT 4049, 21% of a nucleated polypropylene homopolymer Huntsman P4G4K-173X, and 5% of an antiblock concentrate Ampacet 401960.

Tie layer (D) is 21% of the film thickness and comprises on a weight basis 70% of a nucleated polypropylene random copolymer Huntsman P5M4K-072X, 15% of a polyethylene plastomer ExxonMobil EXACT 4049, and 15% of a nucleated polypropylene homopolymer Huntsman P4G4K-173X.

Core layer (B) is 70% of the film thickness and comprises on a weight basis 59.5% of a nucleated polypropylene random copolymer Huntsman P5M4K-072X, 12.75% of a polyethylene plastomer ExxonMobil EXACT 4049, 12.75% of a nucleated polypropylene homopolymer Huntsman P4G4K-173X, and 15% of recycled film.

Adhesive skin layer (C) is 4.5% of the film thickness and comprises on a weight basis 15% of a maleic anhydride grafted polypropylene homopolymer Chemtura Polybond 3150, 80% of a nucleated polypropylene homopolymer Huntsman P4G4K-173X, and 5% of an antiblock concentrate Ampacet 401960.

Example 6

A 2.5 mil (63.5 micrometers) film is prepared by coextrusion, machine direction orientation, annealing to provide for dimensional stability, and corona discharge treatment of the print skin layer.

Print skin layer (A) is 17% of the film thickness and comprises on a weight basis 47% of LLDPE Dow Dowlex 2517, 27% of a polyethylene plastomer ExxonMobil EXACT 4049, 21% of a nucleated polypropylene homopolymer Huntsman P4G4K-173X and 5% of an antiblock concentrate Ampacet 401960.

Tie layer (D) is 15.8% of the film thickness and comprises on a weight basis 56% of a polypropylene random copolymer Huntsman 43S2A which has a 0.9 g/cm$^3$ density and a 1.9 g/10 minutes melt flow rate, 15% of a polyethylene plastomer ExxonMobil EXACT 4049, 18% of a pigment concentrate Colortech 11609-31 which is 70% by weight titanium dioxide in a polypropylene carrier, and 11% of a nucleated polypropylene homopolymer Huntsman P4G4K-173X.

Core layer (B) is 50.2% of the film thickness and comprises on a weight basis 50.4% of a polypropylene random copolymer Huntsman 43S2A, 13.5% of a polyethylene plastomer ExxonMobil EXACT 4049, 9.9% of a nucleated polypropylene homopolymer Huntsman P4G4K-173X, 16.2% of a pigment concentrate Colortech 11609-31, and 10% of recycled film.

Adhesive skin layer (C) is 17% of the film thickness and comprises on a weight basis 15% of a maleic anhydride grafted polypropylene homopolymer Chemtura Polybond 3150, 80% of a nucleated polypropylene homopolymer Huntsman P4G4K-173X, and 5% of an antiblock concentrate Ampacet 401960.

The film is opaque having an opacity of at least 70%.

(E) Adhesive Layer

The invention also relates to an adhesive containing label stock which comprises the inventive film comprising layers (A), (B) and (C) or (A), (D), (B), and (C), and an adhesive layer (E) having an upper surface and a lower surface wherein the upper surface of the adhesive layer is adhesively joined to the lower surface of the adhesive skin layer (C) of the film.

The adhesive layer may be directly coated on the lower surface of the adhesive skin layer, or the adhesive may be transferred from a liner with which the film is combined. Typically, the adhesive layer has a thickness in the range of from about 0.1 to about 2 mils (2.5 to 50 microns). Adhesives suitable for use are those commonly available in the art. Generally, these adhesives include pressure-sensitive adhesives, heat-activated adhesives, hot melt adhesives, and the like. Pressure-sensitive adhesives are particularly useful. These include acrylic adhesives as well as other elastomers such as natural rubber or synthetic rubbers containing polymers or copolymers of styrene, butadiene, acrylonitrile, isoprene and isobutylene. Pressure sensitive adhesives include acrylic based, silicone based and rubber based pressure sensitive adhesives. Pressure-sensitive adhesives are well known in the art and any of the known adhesives can be used with the facestocks of the present invention. In one embodiment, the pressure-sensitive adhesives are based on copolymers of acrylic acid esters, such as, for example, 2-ethyl hexyl acrylate, with polar comonomers such as acrylic acid.

(F) Release Liner

In some embodiments of the invention an adhesive containing label stock comprises the inventive film comprising layers (A), (B) and (C) or (A), (D), (B), and (C), an adhesive layer (E), and a release liner (F) wherein the release liner is releasably joined to the lower surface of the adhesive layer (E). The release liner can comprise a monolayered or multilayered film where the film of the liner can comprise a paper film, a polymeric film such as for example a polyolefin film, or a mixture of any of the foregoing films. The release liner normally comprises a release coating on the film of the release liner such as for example an organosiloxane polymer, which is also known as a silicone, so that the release liner can later be removed from the adhesive layer during the labeling process. In an embodiment of the invention the release liner is joined to an adhesive layer for subsequent transfer of the adhesive to the lower surface of the adhesive skin layer. When the multilayer film of the invention described herein is combined with the adhesive containing liner, the adhesive layer is joined to the lower surface of the multilayer film. Later, when the liner or carrier is removed to expose the adhesive, the adhesive remains permanently joined to the adhesive skin layer.

The present invention also relates to an adhesive label, which is die-cut from an adhesive containing label stock as described above comprising the inventive film comprising layers (A), (B) and (C) or (A), (D), (B) and (C), the adhesive layer (E), and the release liner (F).

Adhesive Containing Label Stock Construction and Processing

The polymeric film of the present invention comprises a multilayered film that can be used with a pressure sensitive adhesive to label an article. The article can be any shaped container to include a bottle, a jug, a jar or a drum. The article can be made of paper, cardboard, glass, metal, plastic, or a mixture thereof. The article can be any shaped container used for packaging a consumer or industrial product. The polymeric film is generally converted to an adhesive containing label stock and then to an adhesive label which is used to label an article.

Figure 3:
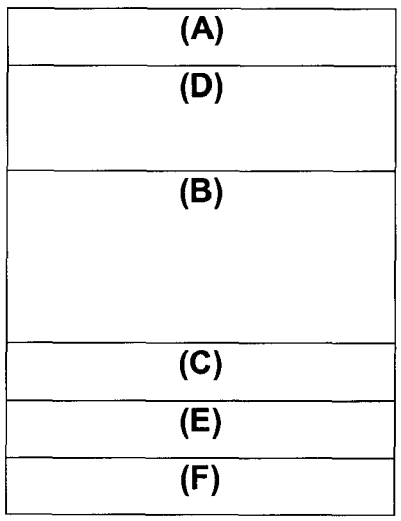
FIG. 3. is a cross sectional view of an adhesive containing label stock of the present invention.

The polymeric film can be converted to an adhesive containing label stock by initially slitting the film into widths suitable for labeling articles. The slit film can then be combined with a pressure sensitive adhesive and a release liner to form an adhesive containing label stock as illustrated in FIG. 3. The adhesive layer (E) can be combined initially with the release liner (F), initially with the slit polymeric film comprising layers (A), (D), (B) and (C) or layers (A), (B) and (C), or with both liner and film simultaneously. The adhesive containing label stock is typically converted to an adhesive label by printing the label stock using any printing means such as for example offset lithography with a suitable printing ink to include for example water-based inks and solvent-based inks and UV-activated inks. Alternatively the slit film can be printed prior to combining with the adhesive and release liner. After printing, a protective varnish can be applied to the printed surface of the film or label stock which also increases clarity. The printed label stock can then be die-cut into a series of individual adhesive labels which can be used to label articles of commerce in a labeling operation. In the labeling operation, a series of die-cut adhesive labels can be peeled away one by one from a matrix of the polymeric film bordering the die-cut label and the underlying release liner.

Each of the documents referred to in the Detailed Description is incorporated herein by reference. All numerical quantities in this application used in the Detailed Description and appended Claims are understood to be modified by the word "about" except in examples and where explicitly indicated otherwise. All range and ratio limits in the Detailed Description and appended Claims are combinable.

While the invention has been presented in the Detailed Description and appended Claims, it is understood that various modifications of this invention will become apparent to those skilled in the art upon reading this application. Therefore these various modifications, that fall within the scope of the appended Claims and/or Detailed Description, are considered to be a part of this invention.

What is claimed is:

1. A polymeric film for labeling articles, comprising:
   (A) a print skin layer having an upper surface and a lower surface and comprising at least one polyethylene having a density of up to 0.94 g/cm3 and at least one polypropylene;
   (B) a core layer having an upper surface and a lower surface and comprising at least one polypropylene copolymer, at least one polypropylene homopolymer, and at least one polyethylene prepared by Ziegler-Natta or metallocene catalysis and having a density ranging from 0.86 to 0.98 g/cm3;
   (C) an adhesive skin layer having an upper surface and a lower surface and comprising at least one polyolefin grafted with an unsaturated carboxylic acid or unsaturated carboxylic acid derivative wherein the lower surface of the print skin layer (A) overlies the upper surface of the core layer (B), and the upper surface of the adhesive skin layer (C) underlies the lower surface of the core layer (B); and
      wherein the core layer comprises from about 50% to about 85% of at least one propylene copolymer, from about 5% to about homopolymer and from about 5% to about 25% of at least one polyethylene.

2. The film of claim 1 wherein the at least one polyethylene in the core layer (B) has a density of from 0.870 to 0.98 g/cm3.

3. The film of claim 2 wherein the core layer comprises on a weight basis from about 50 to about 85% of the polypropylene copolymer, about 5 to about 25% of the polypropylene homopolymer, and about 5 to about 25% of a linear low density polyethylene.

4. The film of claim 1 wherein the adhesive skin layer (C) also comprises at least one propylene homopolymer.

5. The film of claim 1 wherein the adhesive skin layer comprises from about 10 to about 90% by weight of at least one polyolefin grafted with an unsaturated carboxylic acid or unsaturated carboxylic acid derivative and from about 10 to about 90% of at least one propylene homopolymer.

6. The film of claim 5 wherein the polyolefin grafted with an unsaturated carboxylic acid is a maleic anhydride grafted polypropylene.

7. The film of claim 1 wherein the film is prepared by a coextrusion of the layers (A), (B) and (C).

8. The film of claim 1 wherein the film is oriented.

9. The film of claim 8 wherein the film is oriented uniaxially in the machine direction.

10. The film of claim 1 wherein the print skin layer (A) comprises at least one linear low density polyethylene and at least one polypropylene homopolymer.

11. The film of claim 1 wherein the polyethylene of the core layer (B) comprises at least one linear low density polyethylene.

12. The film of claim 1 wherein the print skin layer (A) comprises on a weight basis from about 60% to about 90% of at least one polyethylene and from about 10% to about 40% of at least one polypropylene.

13. The film of claim 1 wherein the print skin layer (A) comprises on a weight basis, from about 60% to about 90% of at least one linear low density polyethylene and from about 10 to about 40% of at least one propylene homopolymer.

14. The film of claim 1 wherein the print skin layer also comprises from about 1 to about 10% of at least one antiblock agent.

15. The film of claim 1 wherein the adhesive skin layer (C) comprises a maleic anhydride grafted polypropylene.

16. The film of claim 1 further comprising (D) a tie layer having an upper surface and a lower surface and comprising at least one polypropylene copolymer, at least one polypropylene homopolymer, and at least one polyethylene prepared by Ziegler-Natta or metallocene catalysis having a density ranging from 0.086 to 0.98 g/cm3 wherein the upper surface of the tie layer is in contact with the lower surface of the print skin layer (A) and the lower surface of the tie layer is in contact with the upper surface of the core layer (B), and the core layer (B) further comprises recycled film.

17. The film of claim 16 wherein the density of the polyethylene in the tie layer is from 0.870 to 0.98 g/cm3.

18. An adhesive containing label stock, comprising: the film of claim 16; and
  (E) an adhesive layer having an upper surface and a lower surface wherein the upper surface of the adhesive layer is adhesively joined to the lower surface of the adhesive skin layer (C) of the film.

19. The label stock of claim 18 further comprising (F) a release finer wherein the release liner is releasably joined to the lower surface of the adhesive layer (E), and the adhesive layer (E) is a pressure sensitive adhesive layer.

20. An adhesive label die-cut from the label stock of claim 19.

21. The film of claim 1 wherein the film is clear.

22. The film of claim 1 wherein the core layer also contains a pigment.

23. The film of claim 1 wherein the film is opaque.

24. A polymeric film for labeling articles, comprising:
  (A) a print skin layer having an upper surface and a lower surface and comprising at least one polyethylene having a density of up to 0.94 g/cm3 and at least one polypropylene;
  (B) a core layer having an upper surface and a lower surface and comprising at least one polypropylene copolymer, at least one polypropylene homopolymer, and at least one polyethylene prepared by Ziegler-Natta or metallocene catalysis and having a density ranging from 0.86 to 0.98 g/cm3;
  (C) an adhesive skin layer having an upper surface and a lower surface and comprising at least one polyolefin grafted with an unsaturated carboxylic acid or unsaturated carboxylic acid derivative wherein the lower surface of the print skin layer (A) overlies the upper surface of the core layer (B), and the upper surface of the adhesive skin layer (C) underlies the lower surface of the core layer (B); and
  (E) an adhesive layer having an upper surface and a lower surface wherein the upper surface of the adhesive layer is adhesively joined to the lower surface of the adhesive skin layer (C) of the film.

* * * * *